(12) United States Patent
Chang (10) Patent No.: US 7,430,023 B2
(45) Date of Patent: Sep. 30, 2008

(54) LIQUID CRYSTAL DISPLAY WITHOUT STORAGE CAPACITANCE ELECTRODE LINES

(75) Inventor: Yung-Chi Chang, Tao Yuan Shien (TW)

(73) Assignee: Au Optronics Corp., Tao Yuan Shien (TW)

( * ) Notice: Subject to any disclaimer, the term of this patent is extended or adjusted under 35 U.S.C. 154(b) by 342 days.

(21) Appl. No.: 11/379,580

(22) Filed: Apr. 21, 2006

(65) Prior Publication Data
US 2006/0187369 A1   Aug. 24, 2006

Related U.S. Application Data

(62) Division of application No. 10/923,627, filed on Aug. 20, 2004, now Pat. No. 7,113,234.

(30) Foreign Application Priority Data
May 13, 2004   (TW) ............... 93113442 A (51) Int. Cl.
*G02F 1/1339* (2006.01)
*G02F 1/136* (2006.01)
(52) U.S. Cl. .................... 349/43; 349/156
(58) Field of Classification Search ........ 349/155, 349/156, 43, 42, 38, 39
See application file for complete search history.

(56) References Cited

U.S. PATENT DOCUMENTS 5,748,266 A   5/1998   Kodate 6,525,788 B1   2/2003   Nakagawa et al. ........... 349/44
2006/0158600 A1*   7/2006   Mun et al. .................. 349/156
2007/0024799 A1*   2/2007   Kira et al. .................. 349/156

FOREIGN PATENT DOCUMENTS

| JP | 08262484 | 10/1996 |
| JP | 10268356 | 10/1998 |
| JP | 2000-122097 | 4/2000 |

OTHER PUBLICATIONS

JP Office Action mailed Jun. 18, 2008.

* cited by examiner

*Primary Examiner*—David C. Nelms
*Assistant Examiner*—David Y Chung
(74) *Attorney, Agent, or Firm*—Thomas, Kayden, Horstemeyer & Risley (57) ABSTRACT

A liquid crystal display without storage capacitance electrode lines. A plurality of pixel areas is provided, each comprising a storage capacitor structure, a first substrate and a second substrate with a liquid crystal layer interposed therebetween. A discrete conductive layer is on the first substrate. An insulating layer is overlying the first substrate and the discrete conductive layer. A first transparent conductive layer is on part of the insulating layer to overlap a first portion of the discrete conductive layer. A second transparent conductive layer is on part of the insulating layer to overlap a second portion of the discrete conductive layer. A plug is to penetrate the insulating layer. The discrete conductive layer is electrically connected to the first transparent conductive layer or the second transparent conductive layer via the plug. A third transparent conductive layer serving as a common electrode electrically connects the first transparent conductive layer.

11 Claims, 10 Drawing Sheets

LIQUID CRYSTAL DISPLAY WITHOUT STORAGE CAPACITANCE ELECTRODE LINES

CROSS-REFERENCE TO RELATED APPLICATION

This application is a divisional of U.S. application Ser. No. 10/923,627, filed on Aug. 20, 2004.

BACKGROUND

The invention relates to a liquid crystal display and fabrication method thereof, and more particularly to a liquid crystal display without storage capacitance electrode lines.

Generally, a liquid crystal display (LCD) comprises a lower substrate, an upper substrate and a liquid crystal layer interposed therebetween. The upper substrate typically comprises a color filter and a common electrode. The lower substrate typically comprises a plurality of pixel areas defined by crossing gate lines and source lines (or data lines). Each pixel area comprises a thin film transistor serving as a switching element located near the intersection of the gate and source lines and a pixel electrode electrically connected to the thin film transistor. The thin film transistor comprises a gate, a source and a drain, wherein the gate is typically an extended portion of the gate line and the drain is electrically connected to the pixel electrode via a contact hole. The liquid crystal layer interposed between the common electrode and the pixel electrode forms a capacity of liquid crystal (referred to in the following as $C_{LC}$).

Figure 1A:
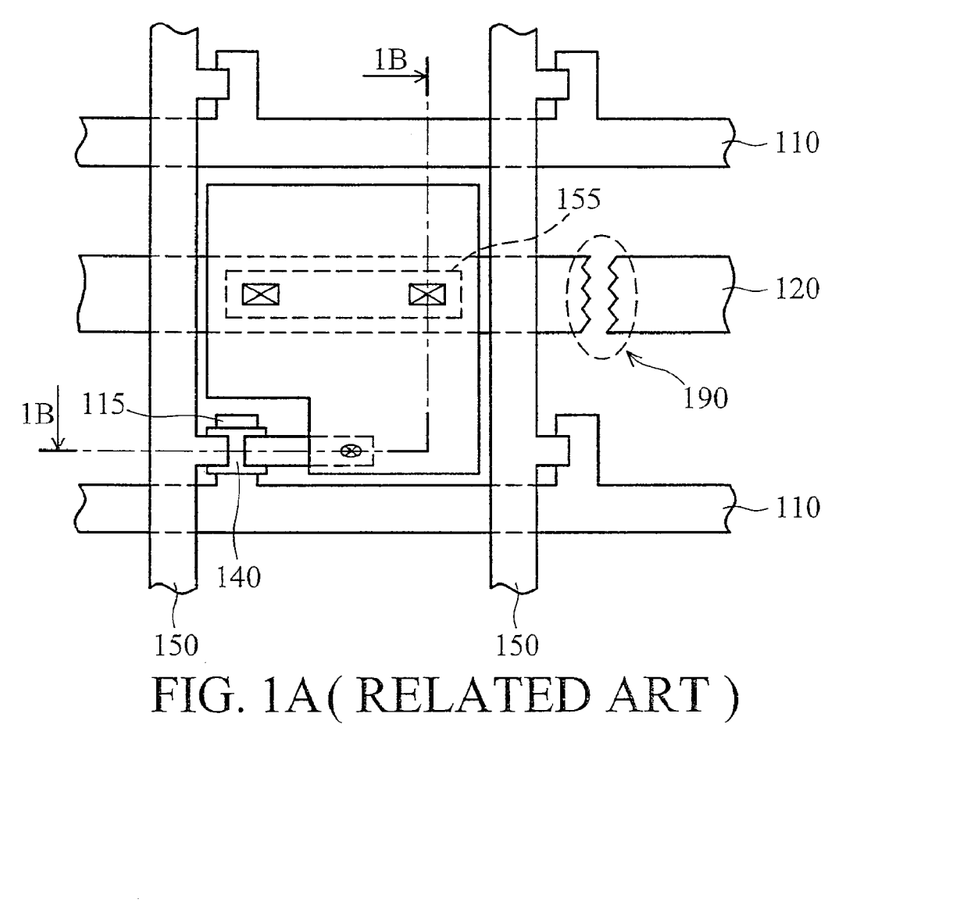
FIG. 1A is a partial top view of the conventional array substrate.
Figure 1B:
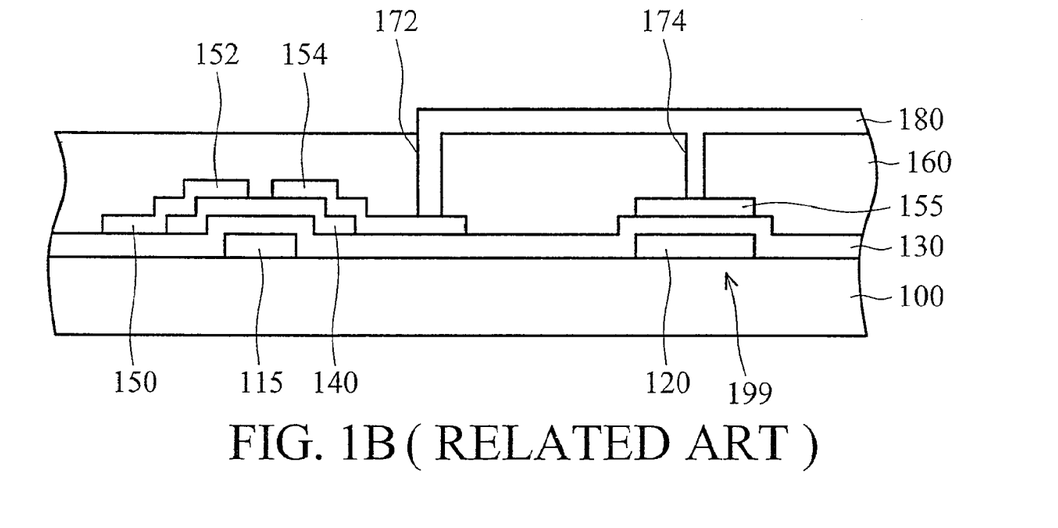
FIG. 1B shows a cross-section view taken along line 1B-1B of FIG. 1A.

In order to improve image quality, a storage capacitor (referred to in the following as $C_s$) must be formed in each pixel area. FIG. 1A is a partial top view of a conventional array substrate. FIG. 1B shows a cross-section view taken along line 1B-1B of FIG. 1A. In FIGS. 1A and 1B, a transversely extended gate line 110 and a storage capacitance electrode line 120 (referred to in the following as $C_s$ lines 120) are formed on a glass substrate 100. The gate line 110 comprises a protrusion 115 serving as a gate 115. A gate insulating layer 130 is then formed covering the entire substrate 100. A semiconductor 140 is formed on part of the gate insulating layer 130. A longitudinally extended source line 150 and a discrete metal layer 155 are formed on part of the insulating layer 130. The source line 150 comprises a source 152 extended onto part of the semiconductor layer 140. Simultaneously, a drain 154 is formed on part of the semiconductor layer 140 and is extended onto part of the gate insulating layer 130.

An insulating layer 160 is then formed covering the entire substrate 100. A first opening 172 and a second opening 174 penetrating the insulating layer 160 are formed to expose the drain 154 and the metal layer 155 respectively. A pixel electrode 180 is formed on part of the insulating layer 160 and fills the openings 172 and 174 to electrically connect the drain 154 and the metal layer 155. Accordingly, the metal layer 155, the $C_s$ line 120 and the gate insulating layer 130 interposed therebetween constitute a $C_s$ 199.

Nevertheless, the conventional LCD has some drawbacks. For example, the entire LCD panel must be discarded due to abnormal bright lines when the $C_s$ line 120 is broken 190. Additionally, since the $C_s$ line 120 is opaque, the aperture ratio of a pixel is reduced resulting inferior pixel quality. Furthermore, cross-talk may occur at the intersection of the $C_s$ line 120 and the source line 150, degrading display quality.

U.S. Pat. No. 6,172,728 to Hiraishi, the entirety of which is hereby incorporated by reference, describes a reflective LCD including address lines shaped to reduce parasitic capacitance. The address lines of the reflective LCD have bends, notches, protrusions and holes, thereby improving light efficiency and minimizing parasitic capacitance.

U.S. Pat. No. 6,404,465 to Nakayama et al., the entirety of which is hereby incorporated by reference, describes an array substrate of an LCD. In the array substrate, $C_s$ lines overlap an upper region of source lines and pixel electrodes overlap an upper region of the $C_s$ lines.

SUMMARY

Embodiments of the invention provide a liquid crystal display with storage capacitor structures and fabrication method thereof.

Embodiments of the invention further provide a liquid crystal display without $C_s$ lines and fabrication method thereof.

An embodiment of a liquid crystal display comprises a plurality of pixel areas. Each pixel area comprises a storage capacitor structure and further comprises a first substrate and a second substrate disposed opposite thereto with a liquid crystal layer interposed therebetween. A discrete conductive layer is formed on the first substrate. An insulating layer is over the first substrate and the discrete conductive layer. A first transparent conductive layer is formed on part of the insulating layer to overlap a first portion of the discrete conductive layer. A second transparent conductive layer is formed on part of the insulating layer to overlap a second portion of the discrete conductive layer. A plug penetrates the insulating layer and the discrete conductive layer is electrically connected to the first transparent conductive layer or the second transparent conductive layer via the plug. An insulating spacer is formed on a portion of an interior of the second substrate and extended into the liquid crystal layer to maintain a cell gap. A third transparent conductive layer serving as a common electrode is conformally formed on the interior of the second substrate and a surface of the insulating spacer to electrically connect the first transparent conductive layer. An electrode of the storage capacitor structure comprises the first transparent conductive layer or the second transparent conductive layer.

Another embodiment of a method of forming a liquid crystal display comprises the steps of: forming a transversely extending gate line and a discrete metal layer on a first substrate, wherein the gate line comprises a gate; forming an insulating layer to cover the gate line, the discrete metal layer and the first substrate; forming a semiconductor layer on the insulating layer above the gate; simultaneously forming a longitudinally extending source line on the insulating layer and a drain on part of the semiconductor layer, wherein the source line comprises a source extended onto part of the semiconductor layer; simultaneously forming a first transparent conductive layer and a second transparent conductive layer on part of the insulating layer, wherein the first transparent conductive layer overlaps a first portion of the discrete metal layer, and the second transparent conductive layer serving as a pixel electrode is electrically connected to the drain and overlaps a second portion of the discrete metal layer; forming a plug penetrating the insulating layer to connect the discrete metal layer, wherein the discrete metal layer is electrically connected to the first transparent conductive layer or the second transparent conductive layer via the plug; providing a second substrate opposite the first substrate; interposing a liquid crystal layer between the first substrate and the second substrate; forming an insulating spacer on a portion of an interior of the second substrate, wherein the insulating spacer is extended into the liquid crystal layer to maintain a cell gap; and forming a conformal common electrode on the interior of the second substrate and a surface of the insulating spacer to electrically connect the first transparent conductive layer; wherein an electrode of a storage capacitor structure comprises the first transparent conductive layer or the second transparent conductive layer.

Embodiments of the invention improve on the conventional technology in that the first substrate (or the lower substrate) comprising at least one storage capacitor structure in each pixel area. An insulating spacer is formed on the interior of the second substrate (or the upper substrate) and extended into a liquid crystal layer to maintain a cell gap. A common electrode is conformally formed on the second substrate and the insulating spacer to electrically connect the upper or lower electrode of the storage capacitor structure. According to the invention, the conventional $C_s$ lines defined on the first substrate are omitted, thereby improving yield, increasing aperture ratio of a pixel and ameliorating the disadvantages of the conventional technology.

Further scope of applicability of embodiments of the invention will become apparent from the detailed description given hereinafter. It should be understood that the detailed description and specific examples are given by way of illustration only, since various changes and modifications within the spirit and scope of the invention will become apparent to those skilled in the art from this detailed description.

DESCRIPTION OF THE DRAWINGS

The invention will become more fully understood from the detailed description given in the following and the accompanying drawings, given by way of illustration only and thus not intended to be limitative of the invention, and wherein.

DETAILED DESCRIPTION

Reference will now be made in detail to embodiments of the invention, examples of which are illustrated in the accompanying drawings. Wherever possible, the same reference numbers are used in the drawings and the description to refer to the same or like elements.

First Embodiment

Figure 2:
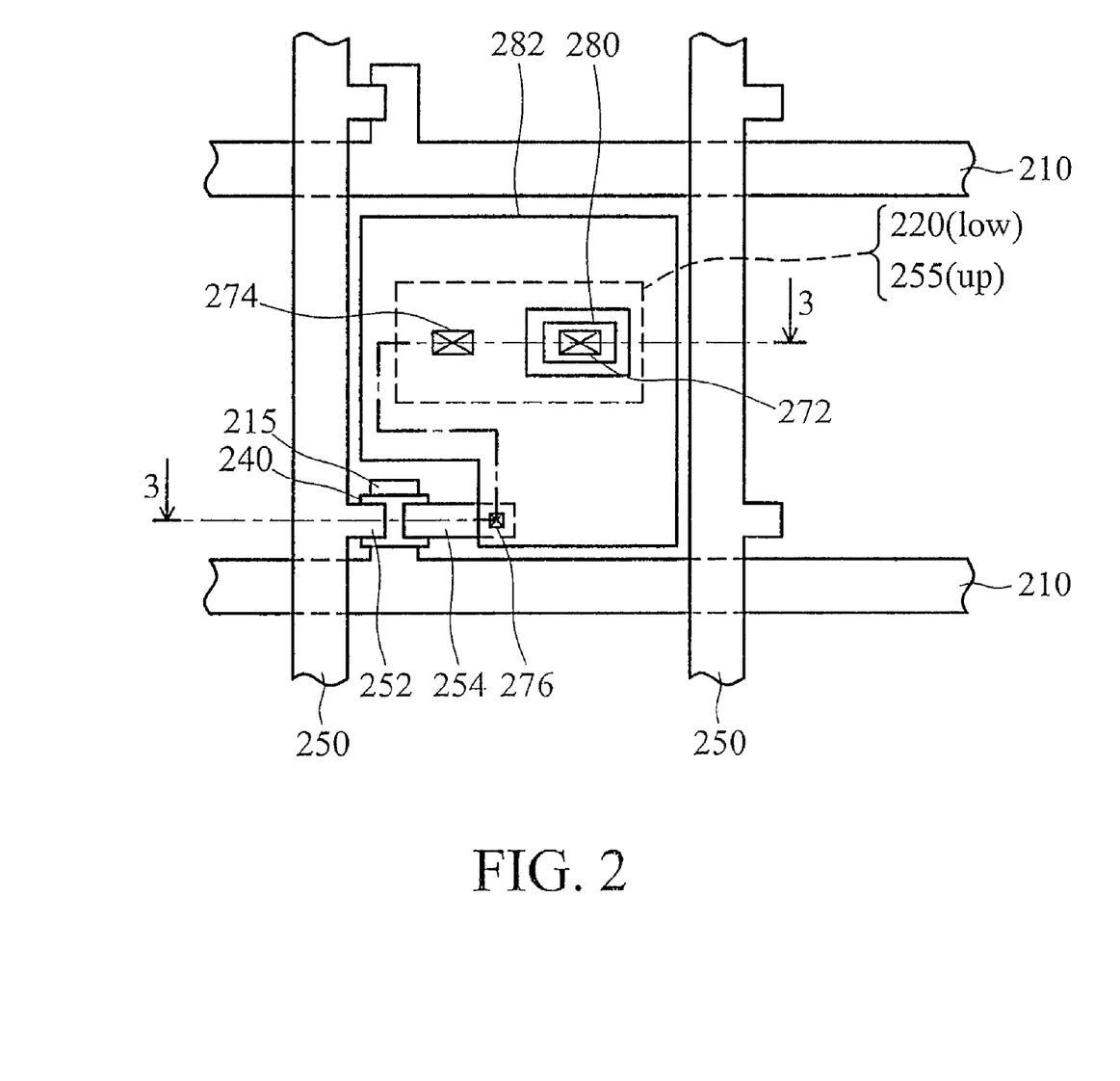
FIG. 2 is a partial top view of an LCD according to a first embodiment of the invention.
Figure 3:
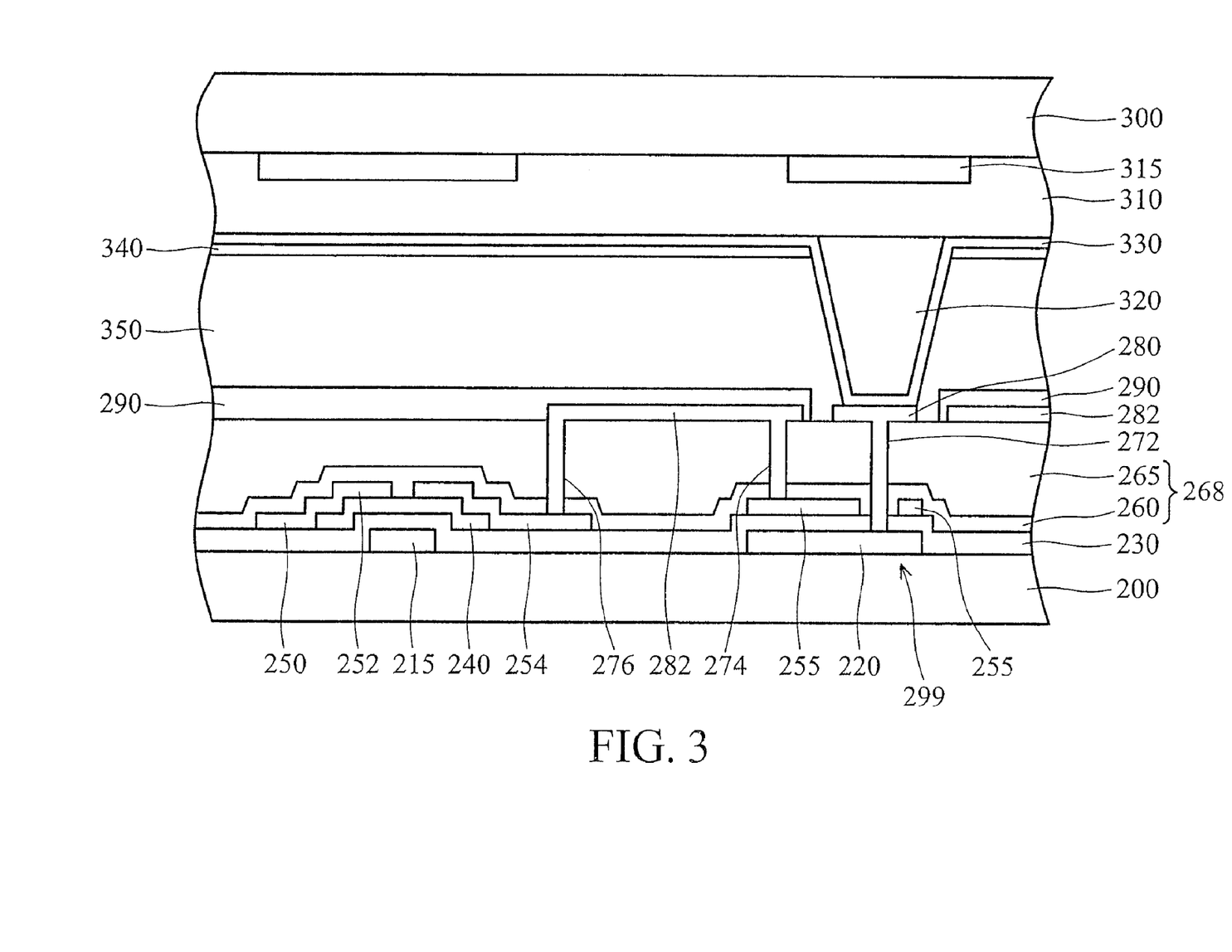
FIG. 3 shows a cross-section view taken along line 3-3 of FIG. 2.

FIG. 2 is a partial top view of an LCD according to a first embodiment of the invention. FIG. 3 shows a cross-section view taken along line 3-3 of FIG. 2. In FIG. 2, the LCD comprises a plurality of pixel areas arranged in an array matrix. The pixel areas are defined by crossing gate and source lines 210 and 250. In order to simplify the illustration, FIGS. 2 and 3 show one pixel area, although there may be numerous pixel areas.

The LCD of the first embodiment comprises a plurality of pixel areas, each comprising a first substrate 200 and a second substrate 300 opposite thereto. A liquid crystal layer 350 is interposed between the first and second substrates 200 and 300. At least one storage capacitor structure 299 is disposed on the first substrate 200, wherein the storage capacitor structure 299 substantially consists of a first conductive layer 220, a second conductive layer 255 and a dielectric layer 230 interposed therebetween. The first and second conductive layers 220 and 255 are discrete and the second conductive layer 255 is located above the first conductive layer 220 and overlaps a portion of the first conductive layer 220. An insulating layer 268 overlies the first substrate 200 and the storage capacitor structure 299. A first opening 272 penetrating the insulating layer 268 and the dielectric layer 230 exposes the first conductive layer 220. A second opening 274 penetrating the insulating layer 268 exposes the second conductive layer 255. A first transparent conductive layer 280 overlies part of the insulating layer 268 and extends into the first opening 272 to electrically connect the first conductive layer 220. A second transparent conductive layer 282 overlies part of the insulating layer 268 and extends into the second opening 274 to electrically connect the second conductive layer 255. An insulating spacer 320 is disposed on the interior of part of the second substrate 300 and extended into the liquid crystal layer 350 to maintain a cell gap. A conformal third transparent conductive layer 330 serving as a common electrode overlies the interior of the second substrate 300 and the surface of the insulating spacer 320 to electrically connect the first conductive layer 280.

An exemplary method of forming the LCD of the first embodiment is described in the following, but is not intended to limit the invention. An insulating substrate 200, serving as a lower substrate 200, can be a glass or quartz substrate. A transversely extended gate line 210 and a discrete first conductive layer 220 (hereinafter referred to as a first metal layer 220) are formed on the lower substrate 200, wherein the gate line 210 comprises a gate 215. The gate line 210 and the first metal layer 220 can be Al, Cr, Mo, alloy of the above or the other conductive material simultaneously formed by the same deposition.

A dielectric layer 230 is then formed overlying the gate line 210, the first metal layer 220 and the lower substrate 200. The dielectric layer 230 can be $SiO_2$ or $Si_3N_4$ formed by, for example, CVD (chemical vapor deposition). A semiconductor layer 240, serving as a channel layer, is formed on the dielectric layer 230 above the gate 215. The semiconductor layer 240 can be a silicon layer formed by, for example, CVD.

A longitudinally extended source line 250 on part of the dielectric layer 230, a drain 254 on part of the semiconductor layer 240 and the dielectric layer 230 and a discrete second conductive layer 255 (hereinafter referred to as a second metal layer 255) on part of the dielectric layer 230 can be simultaneously formed. The source line 250 comprises a source 252 extended onto part of the semiconductor layer 240. The first metal layer 220, the second metal layer 255 and the dielectric layer 230 located therebetween substantially constitute a storage capacitor structure 299. Note that the second metal layer 255 overlaps part of the first metal layer 220. That is, the area of the second metal layer 255 is less than that of the first metal layer 220. The source line 250, the source 252, the drain 254 and the second metal layer 255 can comprise Al, Cr, Mo or other conductive materials simultaneously formed by the same deposition procedure.

Next, a passivation layer 260 is blanketly formed overlying the lower substrate 200. The passivation layer 260 can be $Si_3N_4$ formed by, for example, CVD. In order to obtain a smooth surface, an organic planarization layer 265 is optionally formed on the passivation layer 260. The organic planarization layer 265 can be organic resin formed by, for example, coating. Note that the organic planarization layer 265 is not necessary. In order to simplify the illustration, the passivation layer 260 and the organic planarization layer 265 are generally referred to as an insulating layer 268.

By performing photolithography and etching, a first opening 272, a second opening 274 and a third opening 276 are formed. The first opening 272 penetrates the insulating layer 268 and the dielectric layer 230 to expose the first metal layer 220. The second opening 274 penetrates the insulating layer 268 to expose the second metal layer 255. The third opening 276 penetrates the insulating layer 268 to expose the drain 254.

A first transparent conductive layer 280 is formed on part of the insulating layer 268 and in the first opening 272 to electrically connect the first metal layer 220. A second transparent conductive layer 282, serving as a pixel electrode 282, is formed on part of the insulating layer 268 and in the second opening 274 and the third opening 276 to electrically connect the second metal layer 255 and the drain 254. The first and second transparent conductive layers 280 and 282 can be indium-tin-oxide (ITO) or indium-zinc-oxide (IZO) simultaneously formed by, for example, sputtering. Note that the first and second transparent conductive layers 280 and 282 are isolated from each other. An alignment layer 290 is then formed on the second transparent conductive layer 282 and the insulating layer 268 with the exception of the first transparent conductive layer 280.

An upper substrate 300, such as a glass substrate, disposed opposite the lower substrate 200 is provided. A color filter 310 is optionally formed on the interior of the upper substrate 300. The color filter 310 can comprise a light shielding film 315. In this case, the upper substrate 300 comprises the color filter 310 formed thereon. An insulating spacer 320 is then formed on a portion of the interior of the color filter 310 (i.e. the upper substrate 300) and extended into a liquid crystal layer 350 interposed between the lower and upper substrates 200 and 300. The insulating spacer 320 maintains a cell gap of the liquid crystal layer 350. The insulating spacer 320 can comprise a photosensitive material. Note that a portion of the light shielding film 315 corresponds to the insulating spacer 320.

A conformal third transparent conductive layer 330 serving as a common electrode 330 is formed on the interior of the color filter 310 and the surface of the insulating spacer 320 to electrically connect the first conductive layer 280. The third transparent conductive layer 330 can be ITO or IZO formed by, for example, sputtering.

An alignment layer 340 is then formed on the third transparent conductive layer 330. It is noted that the alignment layer 340 is not disposed on the insulating spacer 320. A liquid crystal material is then filled in a space between the lower substrate 200 and the upper substrate 300, substantially constituting the liquid crystal layer 350.

Figure 6A:
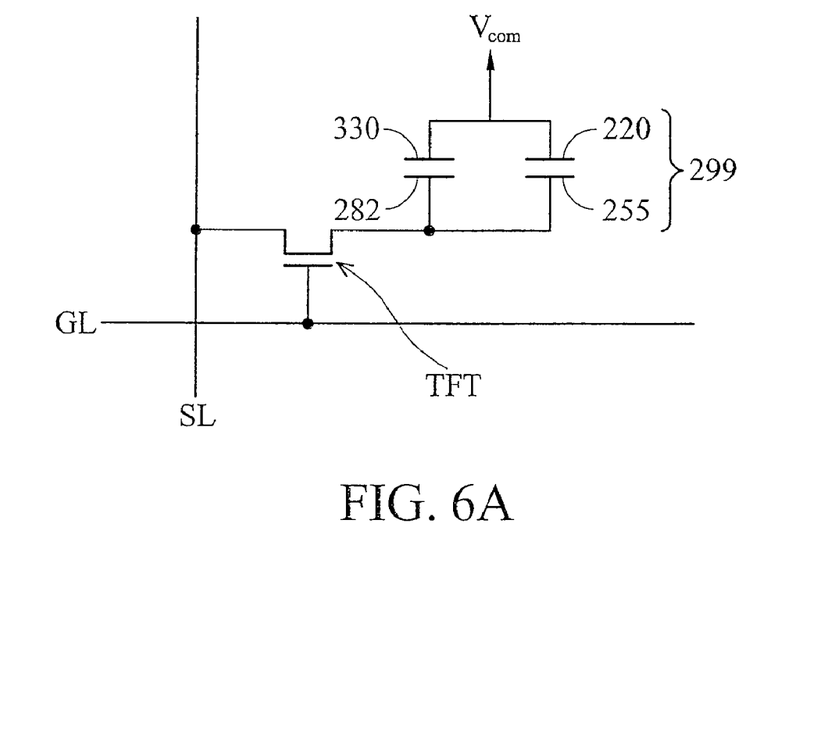
FIG. 6A is a circuit diagram of a pixel area of the first embodiment of the invention.

FIG. 6A is a circuit diagram of a pixel area corresponding to FIG. 3, illustrating the first embodiment of the invention. In FIG. 6A, symbol GL denotes the gate line 210. Symbol SL denotes the source line 250. Symbol TFT denotes the thin film transistor.

Figure 4:
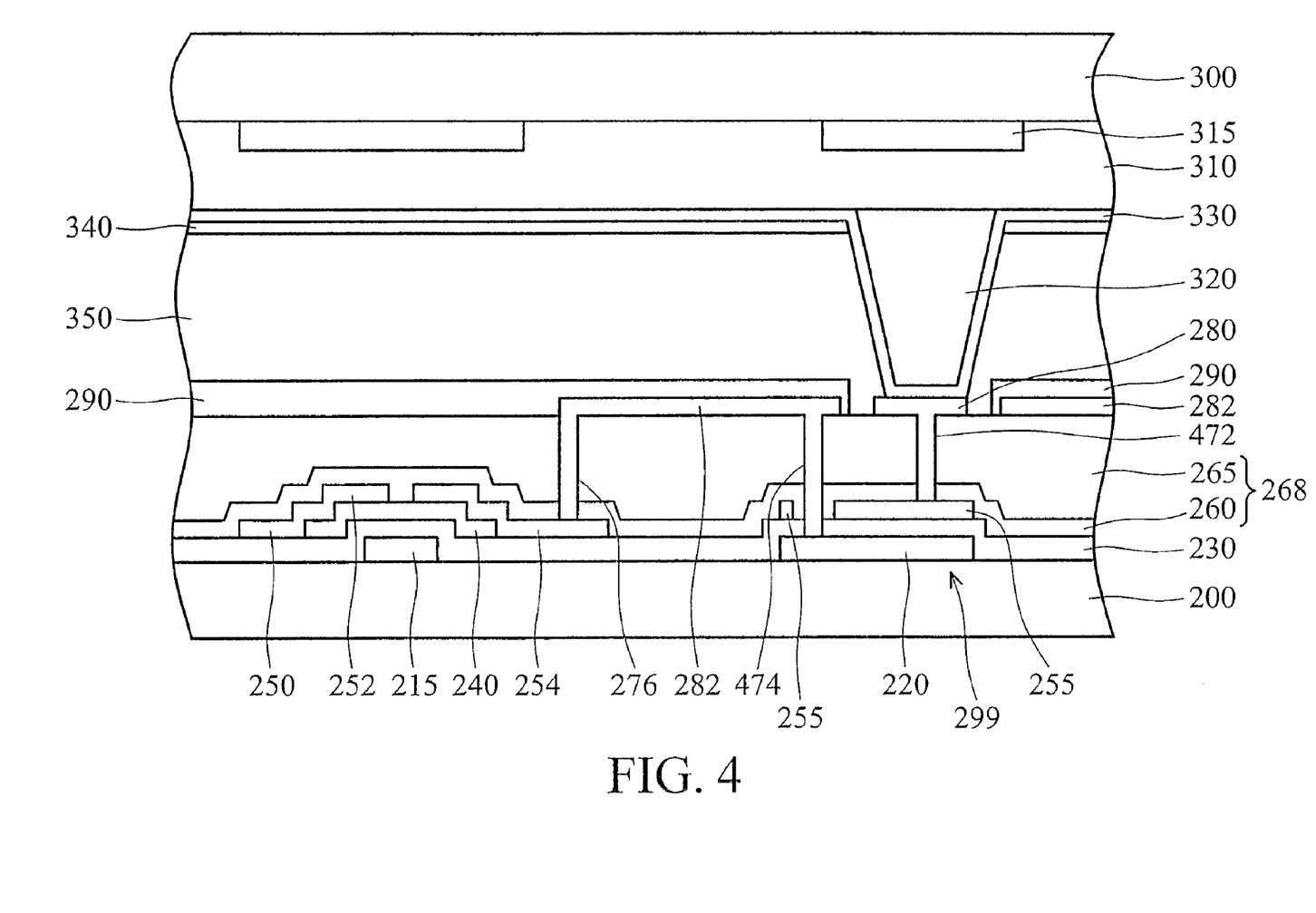
FIG. 4 is a cross-section view of an LCD according to a first variation of the first embodiment of the invention.

FIG. 4 is a cross-section view of an LCD according to a first variation of the first embodiment of the invention. In the first variation, the pixel electrode 282 is electrically connected to the first metal layer 220 and the common electrode 330 is electrically connected to the second metal layer 255.

The LCD of the first variation comprises a plurality of pixel areas, each comprising a first substrate 200 and a second substrate 300 opposite thereto. A liquid crystal layer 350 is interposed between the first and second substrates 200 and 300. At least one storage capacitor structure 299 is disposed on the first substrate 200, wherein the storage capacitor structure 299 substantially consists of a first conductive layer 220, a second conductive layer 255 and a dielectric layer 230 interposed therebetween. The first and second conductive layers 220 and 255 are discrete and the second conductive layer 255 is located above the first conductive layer 220 and overlaps a portion of the first conductive layer 220. An insulating layer 268 overlies the first substrate 200 and the storage capacitor structure 299. A first opening 472 penetrating the insulating layer 268 exposes the second conductive layer 255. A second opening 474 penetrating the insulating layer 268 and the dielectric layer 230 exposes the first conductive layer 255. A first transparent conductive layer 280 overlies part of the insulating layer 268 and extends into the first opening 472 to electrically connect the second conductive layer 255. A second transparent conductive layer 282 overlies part of the insulating layer 268 and extends into the second opening 474 to electrically connect the first conductive layer 220. An insulating spacer 320 is disposed on a portion of the interior of the second substrate 300 and extended into the liquid crystal layer 350 to maintain a cell gap. A conformal third transparent conductive layer 330 serving as a common electrode overlies the interior of the second substrate 300 and the surface of the insulating spacer 320 to electrically connect the first conductive layer 280.

An exemplary method of forming the LCD of the first variation is described in the following. In FIG. 4, a gate 215 and a first metal layer 220 is formed on a lower substrate 200. A dielectric layer 230 covers the gate 215, the first metal layer 220 and the lower substrate 200. A semiconductor layer 240 serving as a channel layer is then formed on the dielectric layer 230 above the gate 215.

A source 252 is then formed to extend onto part of the semiconductor layer 240. A drain 254 is simultaneously formed on part of the semiconductor layer 240 and the dielectric layer 230 and a second metal layer 255 is formed on part of the dielectric layer 230. The first metal layer 220, the second metal layer 255 and the dielectric layer 230 interposed therebetween substantially constitute a storage capacitor structure 299. The second metal layer 255 overlaps part of the first metal layer 220. That is, the area of the second metal layer 255 is less than that of the first metal layer 220.

Next, a passivation layer 260 is blanketly formed overlying the lower substrate 200. In order to obtain a smooth surface, an organic planarization layer 265 is optionally formed on the passivation layer 260. It is noted that the organic planarization layer 265 is not necessary. In order to simplify the illustration, the passivation layer 260 and the organic planarization layer 265 are generally referred to as an insulating layer 268.

A first opening 472, a second opening 474 and a third opening 276 are formed. The first opening 472 penetrates the insulating layer 268 to expose the second metal layer 255. The second opening 274 penetrates the insulating layer 268 and the dielectric layer 230 to expose the first metal layer 220. The third opening 276 penetrates the insulating layer 268 to expose the drain 254.

A first transparent conductive layer 280 is then formed on part of the insulating layer 268 and in the first opening 472 to electrically connect the second metal layer 255. A second transparent conductive layer 282, serving as a pixel electrode 282, is formed on part of the insulating layer 268 and in the second opening 474 and the third opening 276 to electrically connect the first metal layer 220 and the drain 254. The first and second transparent conductive layers 280 and 282 are isolated from each other. An alignment layer 290 is then formed on the second transparent conductive layer 282 and the insulating layer 268 except the first transparent conductive layer 280.

An upper substrate 300, such as glass, opposite the lower substrate 200 is provided. A color filter 310 is optionally formed on the interior of the upper substrate 300. The color filter 310 can comprise a light shielding film 315. In this case, the upper substrate 300 comprises the color filter 310 formed thereon. An insulating spacer 320 is then formed on the interior of part of the color filter 310 (i.e. the upper substrate 300) and extended into a liquid crystal layer 350 interposed between the lower substrate 200 and the upper substrate 300. The insulating spacer 320 maintains a cell gap of the liquid crystal layer 350. A portion of the light shielding film 315 corresponds to the insulating spacer 320.

A conformal third transparent conductive layer 330 serving as a common electrode 330 is formed on the interior of the color filter 310 (i.e. the upper substrate 300) and the surface of the insulating spacer 320 to electrically connect the first conductive layer 280.

An alignment layer 340 is then formed on the third transparent conductive layer 330. It is noted that the alignment layer 340 is not disposed on the insulating spacer 320. A liquid crystal material is then filled in a space between the lower substrate 200 and the upper substrate 300, substantially constituting the liquid crystal layer 350.

Figure 6B:
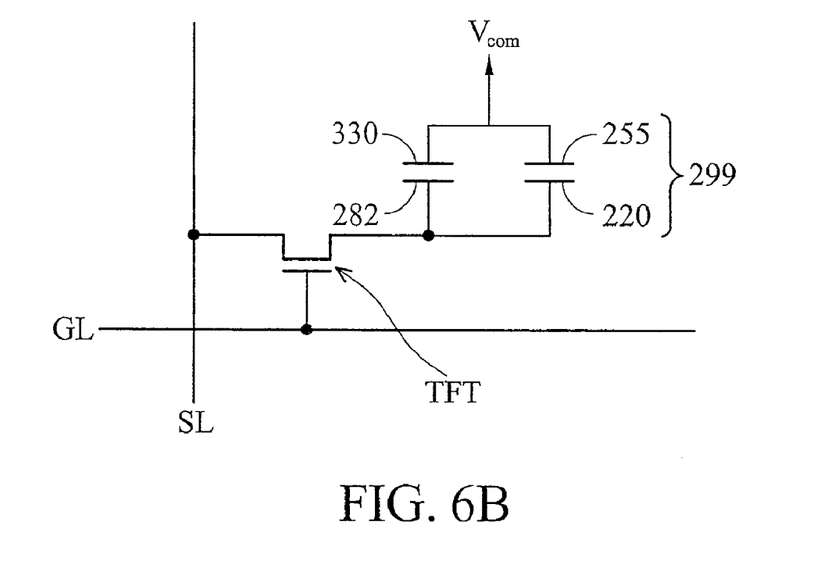
FIG. 6B is a circuit diagram of a pixel area of the first variation of the first embodiment of the invention.

FIG. 6B is a circuit diagram of a pixel area corresponding to FIG. 4, illustrating the first variation of the first embodiment.

Figure 5:
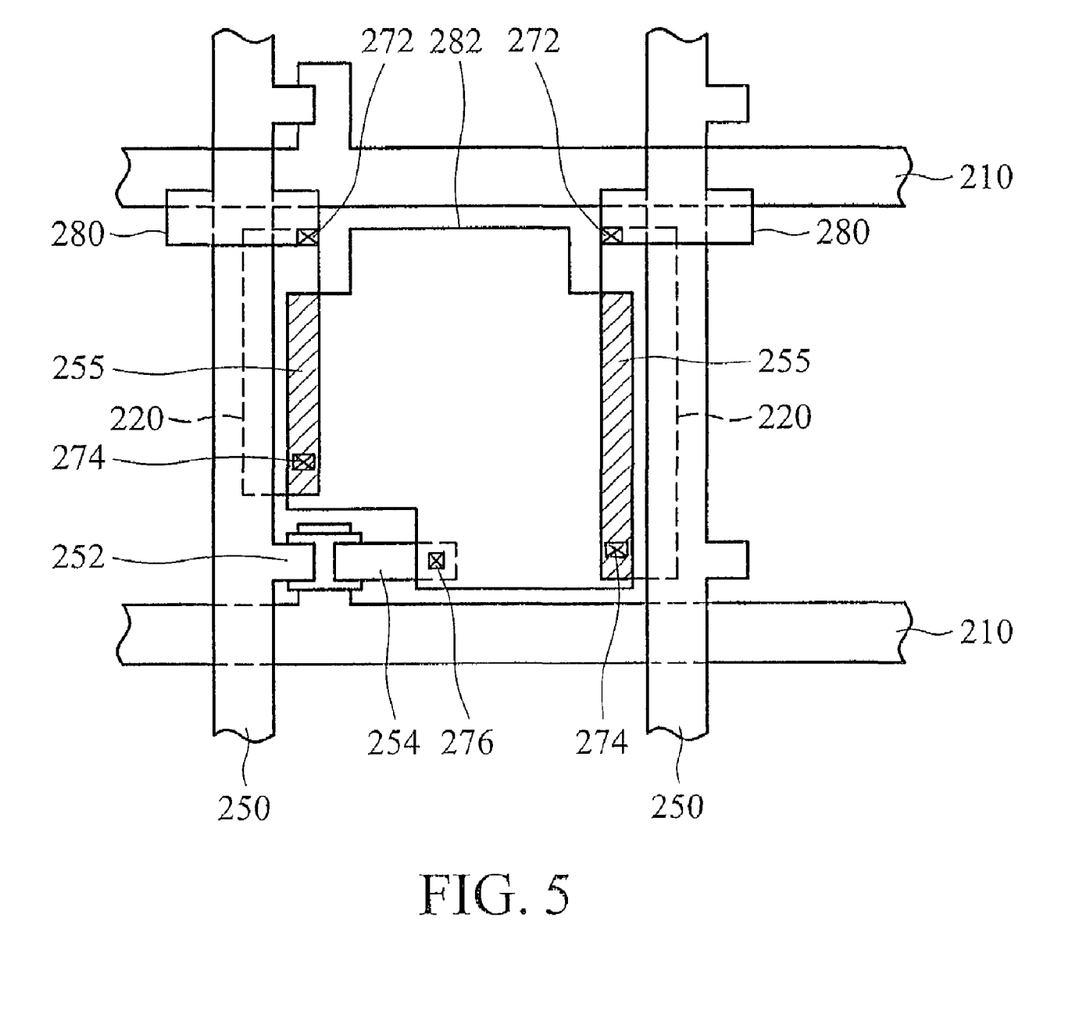
FIG. 5 is a cross-section view of an LCD according to a second variation of the first embodiment of the invention.

FIG. 5 is a cross-section view of an LCD according to a second variation of the first embodiment of the invention. In comparison with FIG. 2, the first metal layer 220 and the second metal layer 255 are defined in at least one region near the periphery of the pixel area in the second variation. Thus, a plurality of storage capacitor structures can be formed in each pixel area. In addition, the metal layers 220 and 255 can serve as a light shielding film to prevent light leakage, decreasing the area of the light shielding film 315 of the color filter 310 and providing an increased aperture ratio. That is, depending on design, the metal layers 220 and 255 can be defined in any desired position in the pixel area.

Second Embodiment

Figure 7:
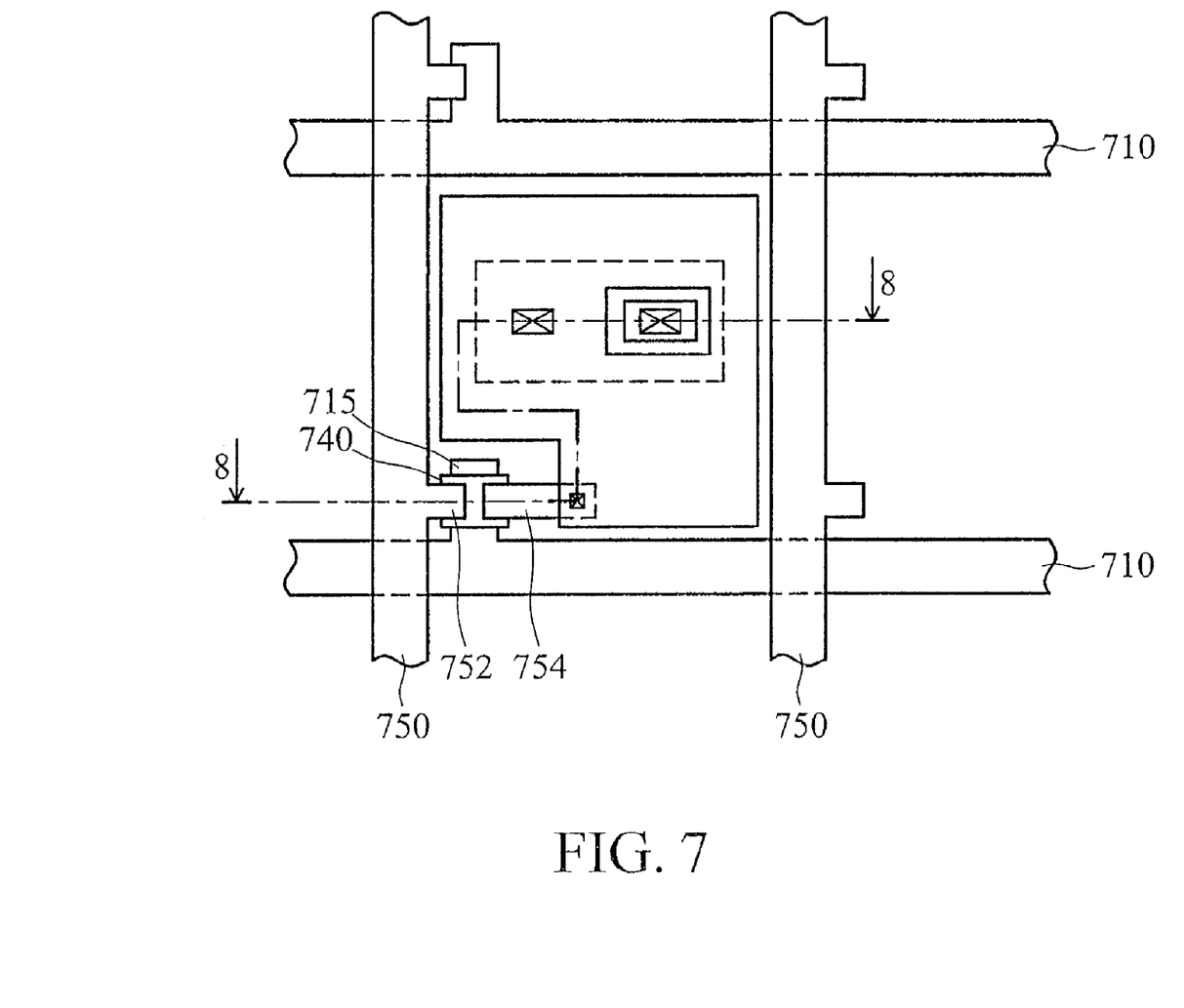
FIG. 7 is a partial top view of an LCD according to a second embodiment of the invention.
Figure 8:
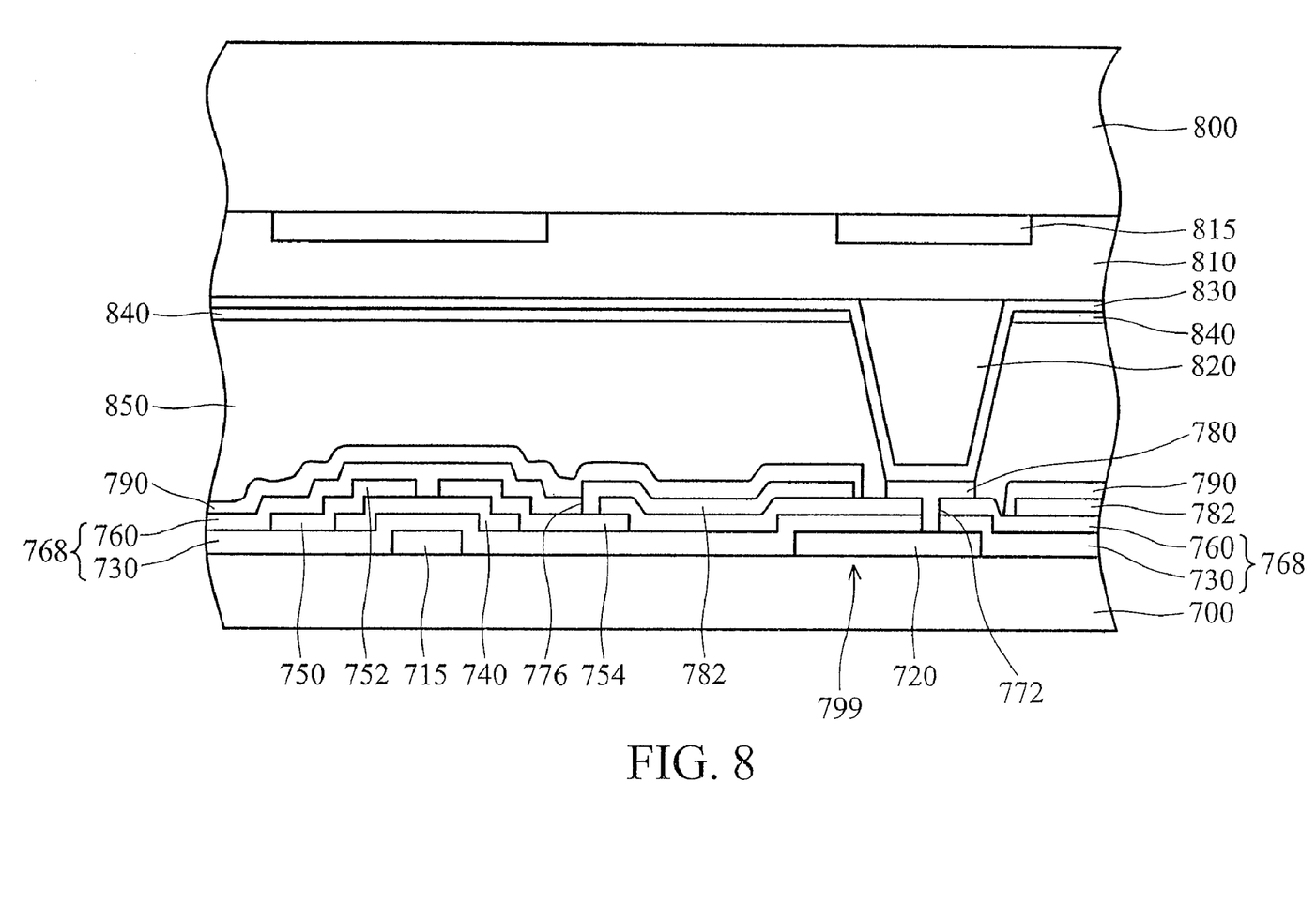
FIG. 8 shows a cross-section view taken along line 3-3 of FIG. 7.

FIG. 7 is a partial top view of an LCD according to a second embodiment of the invention. FIG. 8 shows a cross-section view taken along line 8-8 of FIG. 7. In FIG. 7, the LCD comprises a plurality of pixel areas arranged in an array matrix. The pixel areas are defined by crossing gate and source (or data) lines 710 and 750. In order to simplify the illustration, FIGS. 7 and 8 show one pixel area, although there may be numerous pixel areas.

The LCD of the second embodiment comprises a plurality of pixel areas, each comprising a storage capacitor structure 799 and a first substrate 700 and a second substrate 800 disposed opposite thereto with a liquid crystal layer 850 interposed therebetween. A discrete conductive layer 720 overlies part of the first substrate 700. An insulating layer 768 comprising a dielectric layer 730 and a passivation layer 760 overlies the first substrate 700 and the discrete conductive layer 720. An opening 772 penetrates the insulating layer 768 to expose the discrete conductive layer 720. A first transparent conductive layer 780 overlies part of the insulating layer 768 and fills the opening 772 to electrically connect the discrete conductive layer 720. A second transparent conductive layer 782 overlies part of the insulating layer 768 and overlaps part of the discrete conductive layer 720. An insulating spacer 820 is disposed on a portion of the interior of the second substrate 800 and extended into the liquid crystal layer 850 to maintain a cell gap. A conformal third transparent conductive layer 830 serving as a common electrode overlies the interior of the second substrate 800 and the surface of the insulating spacer 820 to electrically connect the first transparent conductive layer 780. Thus, the storage capacitor structure 799 substantially consists of the discrete conductive layer 720, the insulating layer 768 and the second transparent conductive layer 782.

An exemplary method of forming the LCD of the second embodiment is described in the following, but is not intended to limit the invention. An insulating substrate 700, serving as a lower substrate 700, can be a glass or quartz substrate. A transversely extended gate line 710 and a discrete conductive layer 720 (hereinafter referred to as a metal layer 720) are formed on the lower substrate 700, wherein the gate line 710 comprises a gate 715. The gate line 710 and the metal layer 720 can comprise Al, Cr, Mo or other conductive materials simultaneously formed by the same deposition procedure.

A dielectric layer 730 is then formed overlying the gate line 710, the metal layer 720 and the lower substrate 700. The dielectric layer 730 can be $SiO_2$ or $Si_3N_4$ formed by, for example, CVD. A semiconductor layer 740, serving as a channel layer, is formed on the dielectric layer 730 above the gate 715. The semiconductor layer 740 can be a silicon layer formed by, for example, CVD.

A longitudinally extended source line 750 is formed on part of the dielectric layer 730, and simultaneously, a drain 754 is formed on part of the semiconductor layer 740 and the dielectric layer 730. The source line 750 comprises a source 752 extended onto part of the semiconductor layer 740. The source line 750, the source 752 and the drain 754 can comprise Al, Cr, Mo or other conductive materials simultaneously formed by the same deposition procedure.

Next, a passivation layer 760 is blanketly formed overlying the lower substrate 700. The passivation layer 760 can be $Si_3N_4$ formed by, for example, CVD. In this case, the dielectric layer 730 and the passivation layer 760 are generally referred to as an insulating layer 768.

By performing photolithography and etching, a first opening 772 and a second opening 776 are formed. The first opening 772 penetrates the insulating layer 768 (the passivation layer 760 and the dielectric layer 730) to expose the metal layer 720. The second opening 776 penetrates the passivation layer 760 to expose the drain 754.

A first transparent conductive layer 780 is formed on part of the passivation layer 760 and in the first opening 772 to form a plug (not labeled) electrically connected to the metal layer 720. The first transparent conductive layer 780 overlaps a first portion of the metal layer 720. A second transparent conductive layer 782, serving as a pixel electrode 782, is formed on part of the passivation layer 760 and in the second opening 776 to electrically connect the drain 754. The second transparent conductive layer 782 overlaps a second portion of the metal layer 720. The first and second transparent conductive layers 780 and 782 can be ITO or IZO simultaneously formed by, for example, sputtering. It is noted that the first and second transparent conductive layers 780 and 782 are isolated from each other. An alignment layer 790 is then formed on the second transparent conductive layer 782 and the passivation layer 760 with the exception of the first transparent conductive layer 780.

An upper substrate 800, such as glass, opposite the lower substrate 700 is provided. A color filter 810 is optionally formed on the interior of the upper substrate 800. The color filter 810 can comprises a light shielding film 815. In this case, the upper substrate 800 comprises the color filter 810 formed thereon. An insulating spacer 820 is then formed on a portion of the interior of the color filter 810 (i.e. the upper substrate 800) and extended into a liquid crystal layer 850 interposed between the lower and upper substrates 700 and 800. The insulating spacer 820 maintains a cell gap of the liquid crystal layer 850. The insulating spacer 820 can be made of a photosensitive material. Note that part of the light shielding film 815 corresponds to the insulating spacer 820.

A conformal third transparent conductive layer 830 serving as a common electrode 830 is formed on the interior of the color filter 810 (i.e. the upper substrate 800) and the surface of the insulating spacer 820 to electrically connect the first conductive layer 780. The third transparent conductive layer 830 can be ITO or IZO formed by, for example, sputtering. Thus, a storage capacitor structure 799 substantially consisting of the second transparent conductive layer 782, the metal layer 720 and the insulating layer 768 interposed therebetween is obtained.

An alignment layer 840 is then formed on the third transparent conductive layer 830. It is noted that the alignment layer 840 is not disposed on the insulating spacer 820. A liquid crystal material is then filled in a space between the lower substrate 700 and the upper substrate 800, substantially constituting the liquid crystal layer 850.

Figure 10A:
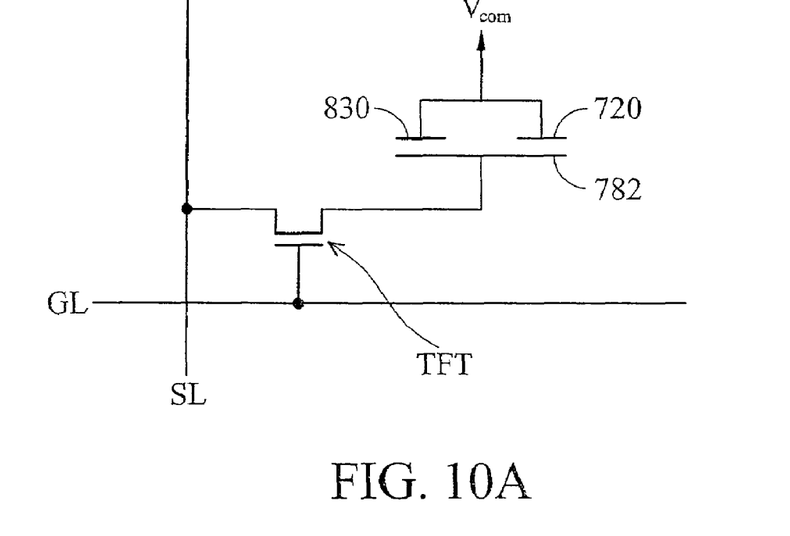
FIG. 10A is a circuit diagram of a pixel area for explaining the second embodiment of the invention.

FIG. 10A is a circuit diagram of a pixel area corresponding to FIG. 8, illustrating the second embodiment of the invention. In FIG. 10A, symbol GL denotes the gate line 710. Symbol SL denotes the source line 750. Symbol TFT denotes the thin film transistor.

Figure 9:
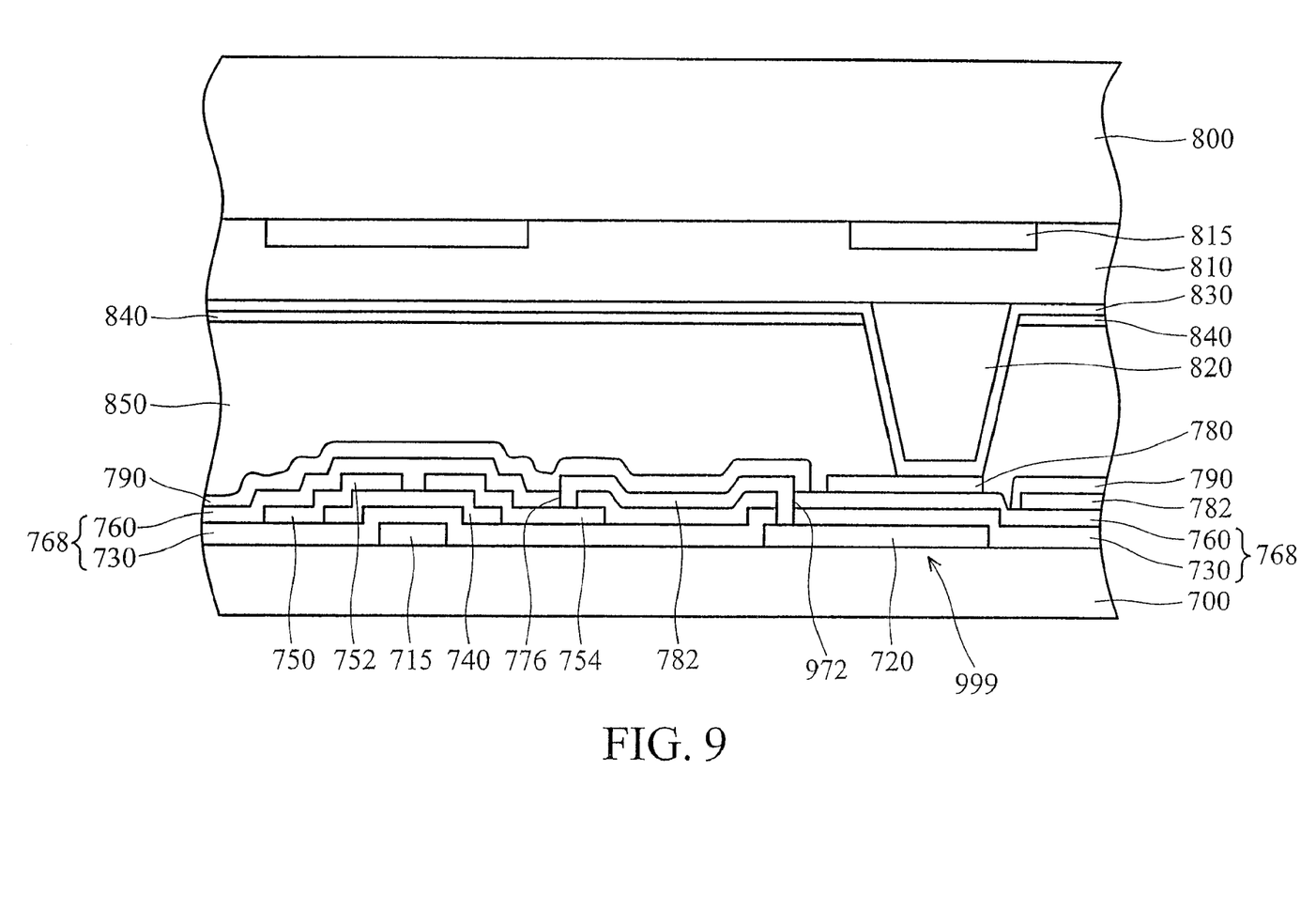
FIG. 9 is a cross-section view of an LCD according to a variation of the second embodiment of the invention.

FIG. 9 is a cross-section view of an LCD according to a variation of the second embodiment of the invention. In the variation, the pixel electrode 782 is electrically connected to the metal layer 720 and the common electrode 830 is not electrically connected to the metal layer 720.

The LCD of the variation comprises a plurality of pixel areas, each comprising a storage capacitor structure 799 and a first substrate 700 and a second substrate 800 disposed opposite each other with a liquid crystal layer 850 interposed therebetween. A discrete conductive layer 720 overlies part of the first substrate 700. An insulating layer 768 comprising a dielectric layer 730 and a passivation layer 760 overlies the first substrate 700 and the discrete conductive layer 720. An opening 972 penetrates the insulating layer 768 to expose the discrete conductive layer 720. A first transparent conductive layer 780 overlies part of the insulating layer 768 and overlaps part of the discrete conductive layer 720. A second transparent conductive layer 782 overlies part of the insulating layer 768 and fills the opening 972 to electrically connect the discrete conductive layer 720. An insulating spacer 820 is disposed on a portion of the interior of the second substrate 800 and extended into the liquid crystal layer 850 to maintain a cell gap. A conformal third transparent conductive layer 830 serving as a common electrode overlies the interior of the second substrate 800 and the surface of the insulating spacer 820 to electrically connect the first transparent conductive layer 780. Thus, the storage capacitor structure 999 substantially consists of the discrete conductive layer 720, the insulating layer 768 and the first transparent conductive layer 780.

An exemplary method of forming the LCD of the variation of the second embodiment is described in the following. A gate 715 and a discrete conductive layer 720 (hereinafter referred to as a metal layer 720) are formed on a lower substrate 700. A dielectric layer 730 is then formed overlying the gate 715, the metal layer 720 and the lower substrate 700. A semiconductor layer 740, serving as a channel layer, is formed on the dielectric layer 730 above the gate 715.

A source 752 is formed on part of the semiconductor layer 740, and simultaneously, a drain 754 is formed on part of the semiconductor layer 740 and the dielectric layer 730. Next, a passivation layer 760 is blanketly formed overlying the lower substrate 700. In this case, the dielectric layer 730 and the passivation layer 760 are generally referred to as an insulating layer 768.

By performing photolithography and etching, a first opening 972 and a second opening 776 are formed. The first opening 972 penetrates the insulating layer 768 (the passivation layer 760 and the dielectric layer 730) to expose the metal layer 720. The second opening 776 penetrates the passivation layer 760 to expose the drain 754.

A discrete first transparent conductive layer 780 is formed on part of the passivation layer 760 and overlaps a first portion of the metal layer 720. A second transparent conductive layer 782, serving as a pixel electrode 782, is formed on part of the passivation layer 760 and in the first opening 972 and the second opening 776 to form two plugs (not symbolized) electrically connected to the metal layer 720 and the drain 754 respectively. The second transparent conductive layer 782 overlaps a second portion of the metal layer 720. It is noted that the first and second transparent conductive layers 780 and 782 are isolated from each other. An alignment layer 790 is then formed on the second transparent conductive layer 782 and the passivation layer 760 except the first transparent conductive layer 780.

Still referring to FIG. 9, an upper substrate 800, such as glass, opposite the lower substrate 700 is provided. A color filter 810 is optionally formed on the interior of the upper substrate 800. The color filter 810 can comprise a light shielding film 815. In this case, the upper substrate 800 comprises the color filter 810 formed thereon. An insulating spacer 820 is then formed on a portion of the interior of the color filter 810 (i.e. the upper substrate 800) and extended into a liquid crystal layer 850 interposed between the lower and upper substrates 700 and 800. The insulating spacer 820 maintains a cell gap of the liquid crystal layer 850. It is noted that part of the light shielding film 815 corresponds to the insulating spacer 820.

A conformal third transparent conductive layer 830 serving as a common electrode 830 is formed on the interior of the color filter 810 (i.e. the upper substrate 800) and the surface of the insulating spacer 820 to electrically connect the first conductive layer 780. Thus, a storage capacitor structure 799 substantially consisting of the first transparent conductive layer 780, the metal layer 720 and the insulating layer 768 interposed therebetween is obtained.

An alignment layer 840 is then formed on the third transparent conductive layer 830. It is noted that the alignment layer 840 is not disposed on the insulating spacer 820. A liquid crystal material is then filled in a space between the lower substrate 700 and the upper substrate 800, substantially constituting the liquid crystal layer 850.

Figure 10B:
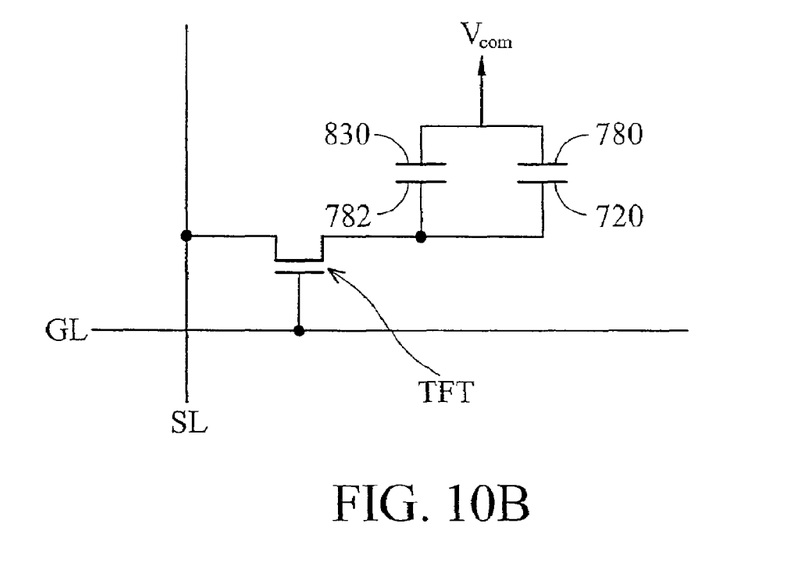
FIG. 10B is a circuit diagram of a pixel area for explaining the variation of the first embodiment of the invention.

FIG. 10B is a circuit diagram of a pixel area corresponding to FIG. 9, illustrating the variation of second embodiment of the invention.

Thus, the embodiments of the invention provide an LCD with storage capacitor structures. At least one storage capacitor structure is formed in the lower substrate in each pixel area. An insulating spacer is formed on a portion of the interior of the upper substrate and extended into a liquid crystal layer to maintain a cell gap. A common electrode is formed on the upper substrate and the insulating spacer to electrically connect the upper or lower electrode of the storage capacitor structure. Thus, the conventional storage capacitance electrode lines defined on the lower substrate can be omitted, thereby improving yield and aperture ratio and ameliorating the disadvantages of the conventional technology.

While the invention has been described by way of example and in terms of the preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display comprising a plurality of pixel areas, each comprising a storage capacitor structure and further comprising:
    a first substrate and a second substrate disposed opposite thereto with a liquid crystal layer interposed therebetween;
    a discrete conductive layer formed on the first substrate;
    an insulating layer over the first substrate and the discrete conductive layer;
    a first transparent conductive layer formed on part of the insulating layer to overlap a first portion of the discrete conductive layer;
    a second transparent conductive layer formed on part of the insulating layer to overlap a second portion of the discrete conductive layer;
    a plug penetrating the insulating layer, wherein the discrete conductive layer is electrically connected to the first transparent conductive layer or the second transparent conductive layer via the plug;
    an insulating spacer formed on a portion of an interior of the second substrate and extended into the liquid crystal layer to maintain a cell gap; and
    a third transparent conductive layer serving as a common electrode conformally formed on the interior of the second substrate and a surface of the insulating spacer to electrically connect the first transparent conductive layer;
    wherein an electrode of the storage capacitor structure comprises the first transparent conductive layer or the second transparent conductive layer.

2. The liquid crystal display according to claim 1, wherein the first substrate is a glass substrate comprising a thin film transistor.

3. The liquid crystal display according to claim 2, wherein the second transparent conductive layer serving as a pixel electrode is electrically connected to the thin film transistor.

4. The liquid crystal display according to claim 1, wherein a gate of the thin film transistor and the discrete conductive layer are formed simultaneously.

5. The liquid crystal display as claimed in claim 1, wherein the second substrate is a glass substrate comprising a color filter.

6. The liquid crystal display according to claim 5, wherein the color filter comprises a light shielding film corresponding to the insulating spacer.

7. The method according to claim 1, wherein when the plug is electrically connected to the first transparent conductive layer, the storage capacitor structure comprises the discrete conductive layer, the insulating layer and the second transparent conductive layer.

8. The method according to claim 1, wherein when the plug is electrically connected to the second transparent conductive layer, the storage capacitor structure comprises the discrete conductive layer, the insulating layer and the first transparent conductive layer.

9. A method of forming a liquid crystal display, comprising the steps of:
    forming a transversely extending gate line and a discrete metal layer on a first substrate, wherein the gate line comprises a gate;
    forming an insulating layer to cover the gate line, the discrete metal layer and the first substrate;
    forming a semiconductor layer on the insulating layer above the gate;
    simultaneously forming a longitudinally extending source line on the insulating layer and a drain on part of the semiconductor layer, wherein the source line comprises a source extended onto part of the semiconductor layer;
    simultaneously forming a first transparent conductive layer and a second transparent conductive layer on part of the insulating layer, wherein the first transparent conductive layer overlaps a first portion of the discrete metal layer, and the second transparent conductive layer serving as a pixel electrode is electrically connected to the drain and overlaps a second portion of the discrete metal layer;
    forming a plug penetrating the insulating layer to connect the discrete metal layer, wherein the discrete metal layer is electrically connected to the first transparent conductive layer or the second transparent conductive layer via the plug;
    providing a second substrate opposite the first substrate;
    interposing a liquid crystal layer between the first substrate and the second substrate;
    forming an insulating spacer on a portion of an interior of the second substrate, wherein the insulating spacer is extended into the liquid crystal layer to maintain a cell gap; and
    forming a conformal common electrode on the interior of the second substrate and a surface of the insulating spacer to electrically connect the first transparent conductive layer;
    wherein an electrode of a storage capacitor structure comprises the first transparent conductive layer or the second transparent conductive layer.

10. The method according to claim 9, wherein when the plug is electrically connected to the first transparent conductive layer, the storage capacitor structure comprises the discrete metal layer, the insulating layer and the second transparent conductive layer.

11. The method according to claim 9, wherein when the plug is electrically connected to the second transparent conductive layer, the storage capacitor structure comprises the discrete metal layer, the insulating layer and the first transparent conductive layer.

* * * * *